US007781699B2

(12) United States Patent
Schneider

(10) Patent No.: US 7,781,699 B2
(45) Date of Patent: Aug. 24, 2010

(54) PLASMA TORCH WITH POST FLOW CONTROL

(75) Inventor: Joseph C. Schneider, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 458 days.

(21) Appl. No.: 11/277,971

(22) Filed: Mar. 30, 2006

(65) Prior Publication Data

US 2007/0235432 A1 Oct. 11, 2007

(51) Int. Cl.
*B23K 10/00* (2006.01)

(52) U.S. Cl. ............. 219/123; 219/121.54; 219/121.55; 219/121.45

(58) Field of Classification Search ............ 219/121.36, 219/121.39, 121.55, 121.54, 121.57, 121.44, 219/121.45, 121.46, 121.59, 121.48, 75
See application file for complete search history.

(56) References Cited

U.S. PATENT DOCUMENTS 3,555,239 A 1/1971 Kerth
4,438,317 A 3/1984 Ueguri et al.
5,620,617 A 4/1997 Borowy et al.
5,660,745 A 8/1997 Naor
5,828,030 A 10/1998 Naor
5,831,237 A 11/1998 Daniel
5,866,869 A 2/1999 Schneider et al.
5,938,919 A 8/1999 Najafabadi
6,093,905 A 7/2000 Hardwick et al.
6,163,009 A 12/2000 Hardwick et al.
6,326,583 B1 * 12/2001 Hardwick et al. ...... 219/121.55
6,677,551 B2 1/2004 Hardwick
6,794,601 B2 9/2004 Norris et al.
2001/0045415 A1 * 11/2001 Hardwick .............. 219/121.44
2005/0045599 A1 3/2005 Matus
2005/0077273 A1 4/2005 Matus et al.
2006/0151446 A1 * 7/2006 Schneider .............. 219/121.45

* cited by examiner

*Primary Examiner*—Mark H Paschall
(74) *Attorney, Agent, or Firm*—Fletcher Yoder PC

(57) ABSTRACT

A system for the efficient utilization of plasma torch post arc cooling gas includes a controller configured to automatically determine a post arc gas flow duration. The controller monitors a plasma arc parameter associated with a temperature of the plasma torch at arc termination. The controller dynamically determines the duration of post arc gas flow through the torch from the plasma arc parameter.

19 Claims, 5 Drawing Sheets

PLASMA TORCH WITH POST FLOW CONTROL

BACKGROUND OF THE INVENTION

The present invention relates generally to plasma cutting systems and, more particularly, to a post arc gas flow control for such systems.

Plasma cutting is a process in which an electric arc is used for cutting or gouging a workpiece. Plasma cutters typically include a power source, an air supply, and a torch. The torch, or plasma torch, is used to create and maintain the plasma arc that performs the cutting/gouging operation. A plasma cutting power source typically receives an input voltage from a transmission power receptacle or generator and provides output power to a pair of output terminals, one of which is connected to an electrode and the other of which is connected to the workpiece. An air supply, either internal or external, is used to carry and propel the arc to the workpiece and cool the torch head.

There are multiple ways of initiating the cutting process, such as contact start, high frequency or high voltage starting. Generally, in contact start plasma cutters, a movable or fixed electrode or consumable serves as a cathode and a fixed or movable nozzle or tip serves as an anode. In some units, the air supply is used to force a separation of the electrode and tip to create an initial or pilot arc. In others, mechanical or electromechanical means can serve to separate the contacts and generate the pilot arc. In either case, once the pilot arc is established, air is forced past the pilot arc whereby it is heated and ionized to form a plasma jet that is forced out of the torch through the opening in the nozzle. The air aids in extending the arc to the workpiece forming a cutting arc and initiating the cutting process.

Both the pilot arc and the cutting arc are electrically supported by the electrode of the plasma torch. Considerable heat is generated during the plasma generating process. The plasma torch must be constructed to withstand considerable heat and power concentration associated with the plasma cutting process. After arc termination, the plasma cutting torch must dissipate the residual heat generated during the cutting process. Known plasma cutting systems dissipate this heat by maintaining an air flow through the torch after arc termination for a predefined time duration. That is, after arc termination, air is allowed to continue to flow through the torch for a preset period. The flow of gas through the torch after arc termination is commonly referred to post flow cooling.

Allowing air to flow through the torch for a preset duration is generally inefficient. The amount of heat that must be removed from the torch after arc termination is directly related to several factors: the duration of the cutting arc, the power level required to perform a cutting process, the type of cutting process performed, the type of tip assembly utilized, and the operator. The higher the temperature associated with the plasma cutting process, the more heat that must be removed from the torch after termination of the plasma cutting process.

Maintaining the post flow of cooling gas for a preset duration disregards the actual arc termination temperature of the plasma torch. That is, the preset duration of post arc cooling flow either frequently provides more cooling than is necessary or terminates before adequate cooling has been achieved. The preset cooling duration is indifferent to the type of torch tip assembly utilized, the plasma cutting process duration, the type of plasma process performed, the operational power associated with the plasma process, and/or the way the operator is performing the operation. Premature termination of the post flow cooling can adversely affect the life cycle of the plasma torch tip assembly and post flow cooling beyond adequate cooling of the tip assembly consumes more cooling gas than is required.

Furthermore, when the torch has been adequately cooled prior to termination of the preset cooling duration, the continued flow of cooling gas through the torch requires continued generation of cooling gas after the plasma torch has been adequately cooled. If the cooling gas is supplied from an enclosed source, such as bottled gas, this continued operation results in the premature depletion of the gas source. If the cooling gas is supplied from a compressor, the unnecessary continuation of the cooling flow results in inefficient utilization of the compressor.

It would, therefore, be desirable to design a plasma cutting system that dynamically controls the post arc cooling flow.

BRIEF DESCRIPTION OF THE INVENTION

The present invention provides a dynamically controlled plasma cutting system that overcomes the aforementioned drawbacks. The system includes a controller configured to automatically determine a post arc gas flow duration. The controller monitors a plasma arc parameter, preferably associated with a temperature, of the plasma torch at arc termination. The controller dynamically determines the duration of post arc gas flow through the torch from the plasma arc parameter.

Therefore, in accordance with one aspect of the present invention, a a welding-type cutting system is disclosed which has a plasma torch constructed to generate an arc and an air supply connection connectable to an air supply to deliver an air flow to the plasma torch. The system includes a controller configured to control the air flow and allow continued air flow through the plasma torch after arc termination for an adjustable duration. The adjustable duration is determined by operating conditions of the plasma torch.

According to another aspect of the present invention, a plasma cutting system having a power source constructed to generate plasma cutting power is disclosed. The plasma cutting system has a plasma torch actuated by a trigger connected to the power source and a gas flow system. The gas flow system is constructed to receive pressurized gas and provide a gas flow to the plasma torch. The system includes a controller configured to monitor a plasma cutting parameter and automatically adjust a post arc gas flow interval through the torch based upon the monitored plasma cutting parameter.

According to a further aspect of the present invention, a method of controlling a plasma torch is disclosed. The method includes the steps of detecting a plasma cutting parameter for each arc generated, determining a time for post arc gas flow from the detected plasma cutting parameter for an arc. The post flow time is variable based on operating conditions of a plasma torch. The process further includes maintaining a gas flow through the plasma torch after termination of the arc for the determined time for post arc gas flow.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
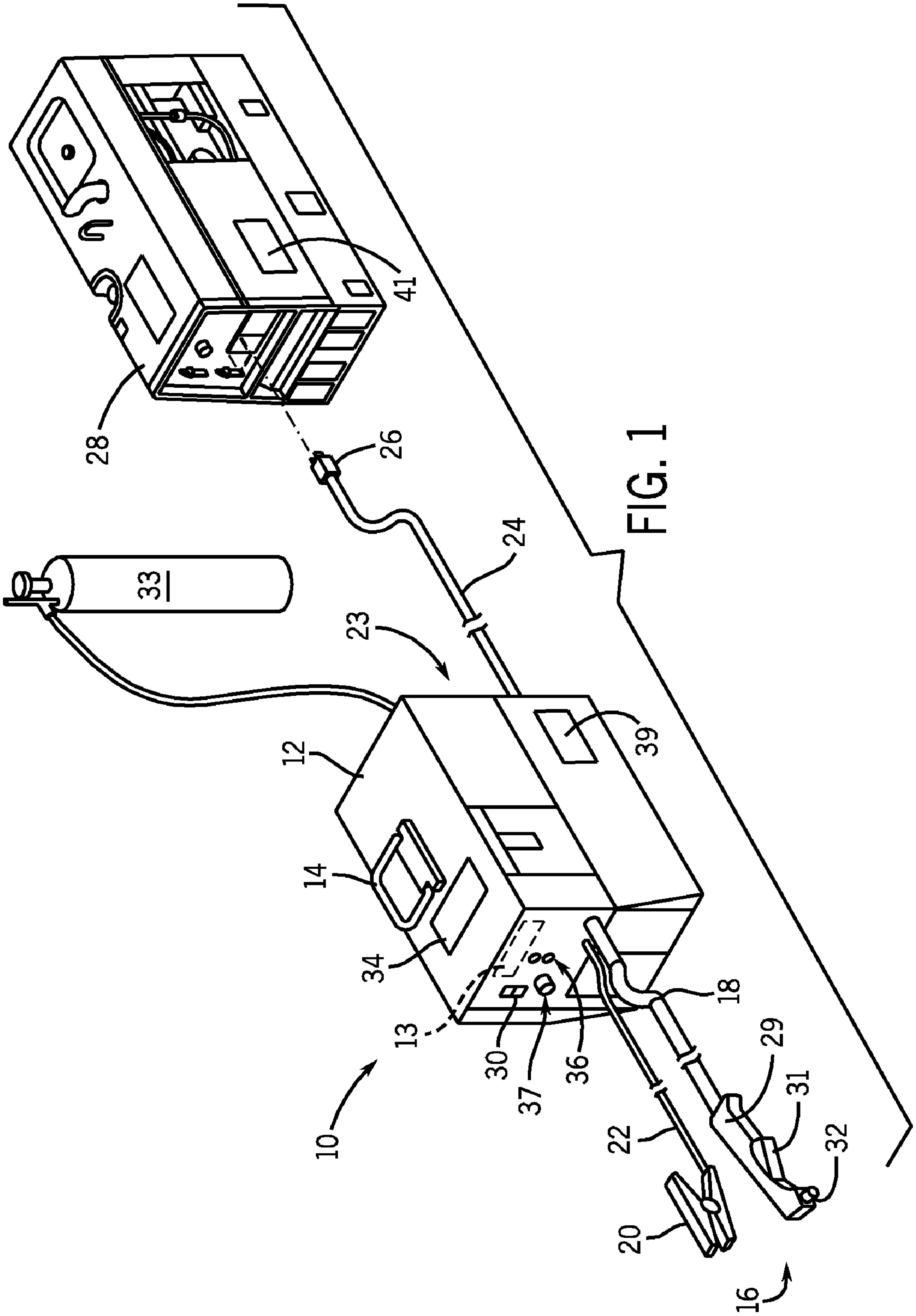
FIG. 1 is a perspective view of a plasma cutting system according to the present invention.

FIG. 1 shows a plasma cutting system 10 according to the present invention. Plasma cutting system 10 is a high voltage system with open circuit output voltages that typically range from approximately 230 Volts Direct Current (VDC) to over 300 VDC. Plasma cutting system 10 includes a power source 12 to condition raw power and generate a power signal suitable for plasma cutting applications. Power source 12 includes a processor/controller 13 that receives operational feedback and monitors the operation of a plasma cutting system 10. Power source 12 includes a handle 14 to effectuate transportation from one site to another. Connected to power source 12 is a torch 16 via a cable 18. Cable 18 provides torch 16 with power and compressed air or gas, and also serves as a communications link between torch 16 and power source 12. Torch 16 includes a handle portion 29, or torch body, having a trigger 31 thereon and work tip 32 extending therefrom. Although shown as attached to torch 16, it is understood and within the scope of the claims that trigger 31 be connected to power source 12 or otherwise remotely positioned relative to torch 16.

Also connected to power source 12 is a work clamp 20 which is designed to connect to a workpiece (not shown) to be cut and provide a grounding or return path. Connecting work clamp 20 to power source 12 is a cable 22 designed to provide the return path, or grounding path, for the cutting current from torch 16 through the workpiece and work clamp 20. Extending from a rear portion 23 of power source 12 is a power cable 24 having a plug 26 for connecting power source 12 to either a portable power supply 28 or a transmission line power receptacle (not shown). Power source 12 includes a plurality of inputs such as an ON/OFF switch 30 and may also include amperage and air pressure regulation controls, indicator lights, and a pressure gauge 36. Power source 12 includes a mode selection dial 37 connected to controller 13 which allows an operator to select a desired mode of operation of the plasma cutting system. That is, an operator can manually configure the plasma cutting system to operate in a cutting or gouging mode.

To effectuate cutting, torch 16 is placed in close proximity to the workpiece connected to clamp 20. A user then activates trigger 31 on torch 16 to deliver electrical power and compressed air to work tip 32 of torch 16 to initiate a pilot arc and plasma jet. Shortly thereafter, a cutting arc is generated as the user moves the torch to the workpiece. The arc transfers from the electrode to the workpiece through the tip. The user may then perform the desired plasma effectuated processing of the workpiece by moving torch 16 across the workpiece. The user may adjust the speed of the cut to reduce spark splatter and provide a more-penetrating cut by adjusting amperage and/or air pressure. Gas is supplied to torch 16 from a pressurized gas source 33, from an internal air compressor 39, or an air compressor 41 external to power source 12.

Figure 2:
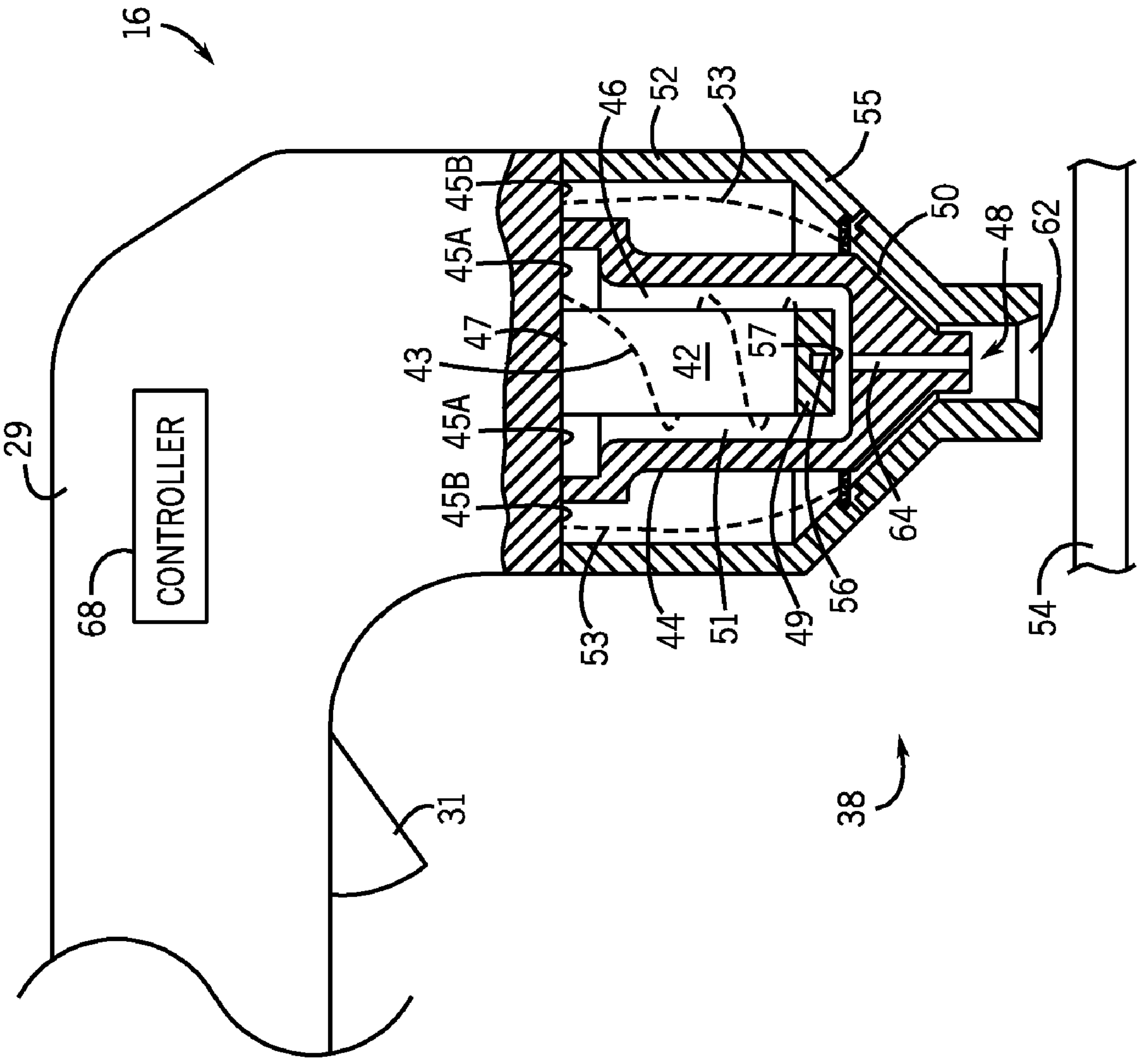
FIG. 2 is a partial cross-sectional view of the plasma torch of the plasma system shown in FIG. 1.

Referring now to FIG. 2, a consumable assembly 38 of plasma cutting torch 16 is shown in partial cross-section. Consumable assembly 38 is attached to handle portion 29 of torch 16 and includes a cathodic component, or electrode 42, and an anodic component, or tip 44. Electrode 42 is centrally disposed within a gas chamber 46 and has a base 47 that electronically communicates with power source 12 through handle portion 29 of torch 16. Electrode 42 includes an electrode tip 49 at an opposite end 51 from base 47 of electrode 42. A plasma forming gas 43 is passed through a swirl ring (not shown) and delivered to gas chamber 46 from a plurality of passages 45A. Gas 43 exits gas chamber 46 through an end portion 48 of tip 44. Another plurality of gas passages 45B deliver a shielding gas 53 to a shielding gas passage 50 extending between tip 44 and a cup or cap 52 and a shield 55 connected to cap 52 of consumable assembly 38.

During a cutting process, a plasma jet passes from torch 16 through end portion 48 of tip 44 and exits torch 16 through a tapered opening 62 of shield 55. A flow of shielding gas also exits torch 16 through opening 62 of shield 55 and generally encompasses the plasma jet. End portion 48 of tip 44 and opening 62 cooperate to direct the plasma flow from a plasma chamber 64 into a concentrated, highly charged, plasma flow. Plasma chamber 64 is formed in the space between electrode 42 and end portion 48 of tip 44.

A pilot arc is generally formed in plasma chamber 64 between electrode 42 and tip 44, collectively known as the contacts. The flow of gas through the torch is converted to a plasma jet initiated by the pilot arc. As shown, electrode 42 is movable relative to tip 44 such that electrode 42 is in contact with tip 44 during an idle or non-operating mode of plasma torch 16. Actuation of trigger 31 initiates a current and an air flow. The air flow separates electrode 42 and tip 44 and cooperates with the current to form the pilot arc between electrode 42 and tip 44. Gas 43 passing from gas chamber 46 directs the pilot arc through nozzle portion 48 of tip 44 and opening 62 of shield 55 toward a workpiece 54.

It is understood and within the scope of the appending claims that the torch could be constructed to form the pilot arc through other means than the contact/separation means shown. For example, the plasma torch could generate the pilot arc by what are commonly referred to as high frequency and/or high voltage starting torches. Such torches do not necessarily include movable parts but generate a pilot arc with an electrical signal sufficient to traverse the gap between the cathodic and the anodic components of the torch.

During a cutting operation, the cutting arc initiated from the pilot arc is maintained between workpiece 54 and an insert 56 of electrode 42. The cutting arc swirls about an end 57 of insert 56 and travels to workpiece 54 in the plasma flow from torch 16. Insert 56 is constructed to be conductive and to resist deterioration associated with the high temperature and power of the arc which swirls thereabout. Insert 56 exhibits certain preferred electrical, thermal, and chemical properties and is preferably formed of a hafnium or a zirconium based material.

During operation of plasma torch 16, considerable heat is generated proximate consumable assembly 38. Plasma torch 16 must be adequately cooled between successive arc cycles to prevent premature wear of the consumable assembly. Maintaining the flow of plasma forming gas 43 and/or the flow of shielding gas 53 through torch 16 after arc termination removes the residual heat associated with arc generation from the torch.

Figure 3:
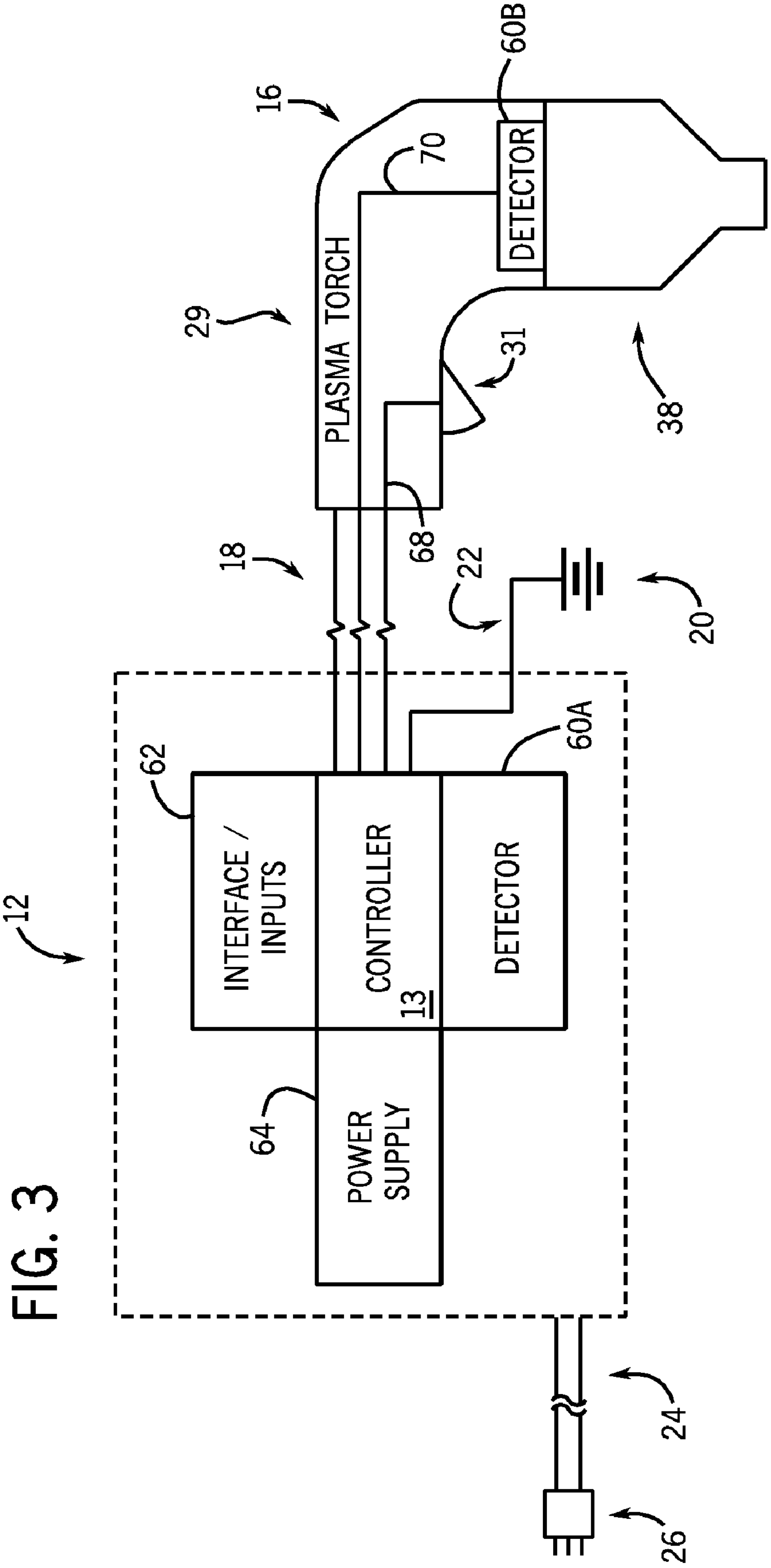
FIG. 3 is schematic representation of the plasma cutting system shown in FIG. 1.

As shown in FIG. 3, controller 13 is operatively connected to power source 12 and plasma torch 16. Controller 13 is also operatively connected to a detectors 60A, 60B. Detector 60A, is disposed in power source 12 whereas detector 60B is disposed in plasma torch 16. Regardless of the relative position of the detectors 60A, 60B, it is envisioned that only one of detectors 60A, 60B need be provided and configured to communicate to controller 13 a plasma arc parameter.

The plasma arc parameter is defined as any parameter from which controller 13 can calculate or estimate an arc termination temperature of plasma torch 16. It is appreciated that a detected temperature of plasma torch 16, a user input 62, an arc duration, and/or a plasma arc power usage provide the information necessary to determine the temperature of plasma torch 16 at arc termination. The plasma arc power usage is further defined as amps per second, watts per second, or plasma system energy generated by a power supply 64 of power source 12. Regardless of which plasma arc parameter is utilized, controller 13 is configured to determine a duration of post arc gas flow from the plasma arc parameter.

Detector 60B is operatively connected to controller 13 and is configured to detect a parameter at consumable assembly 38 that is indicative of a temperature of the consumable assembly at any given time. That is, it is appreciated that detector 60B be a stress/strain gauge, a thermocouple, or an optical detector operationally connected to a component of consumable assembly 38. Understandably, controller 13 could be configured to map the detected value to a post arc flow duration value. Detector 60B is configured to monitor a size of a consumable component provided the size of the consumable component can be correlated to a temperature of plasma torch consumable assembly 38. Alternatively, if detector 60B is a thermocouple, detector 60B is configured to communicate an electrical signal to controller 13 indicative of the temperature of plasma torch 16.

Trigger 31 and detector 60B are connected to controller 13 via connections 68, 70, respectively. Such a construction allows controller 13 to be dynamically responsive to feedback communicated thereto from torch 16 via cable 18. Controller 13 is also configured to control the flow of plasma forming and cooling gas directed to torch 16. Upon an arc termination, controller 13 is constructed to maintain the flow of gas to torch 16 such that the after arc gas flow, post arc gas flow, or post flow removes residual heat from the torch generated during the plasma cutting process.

Figure 4:
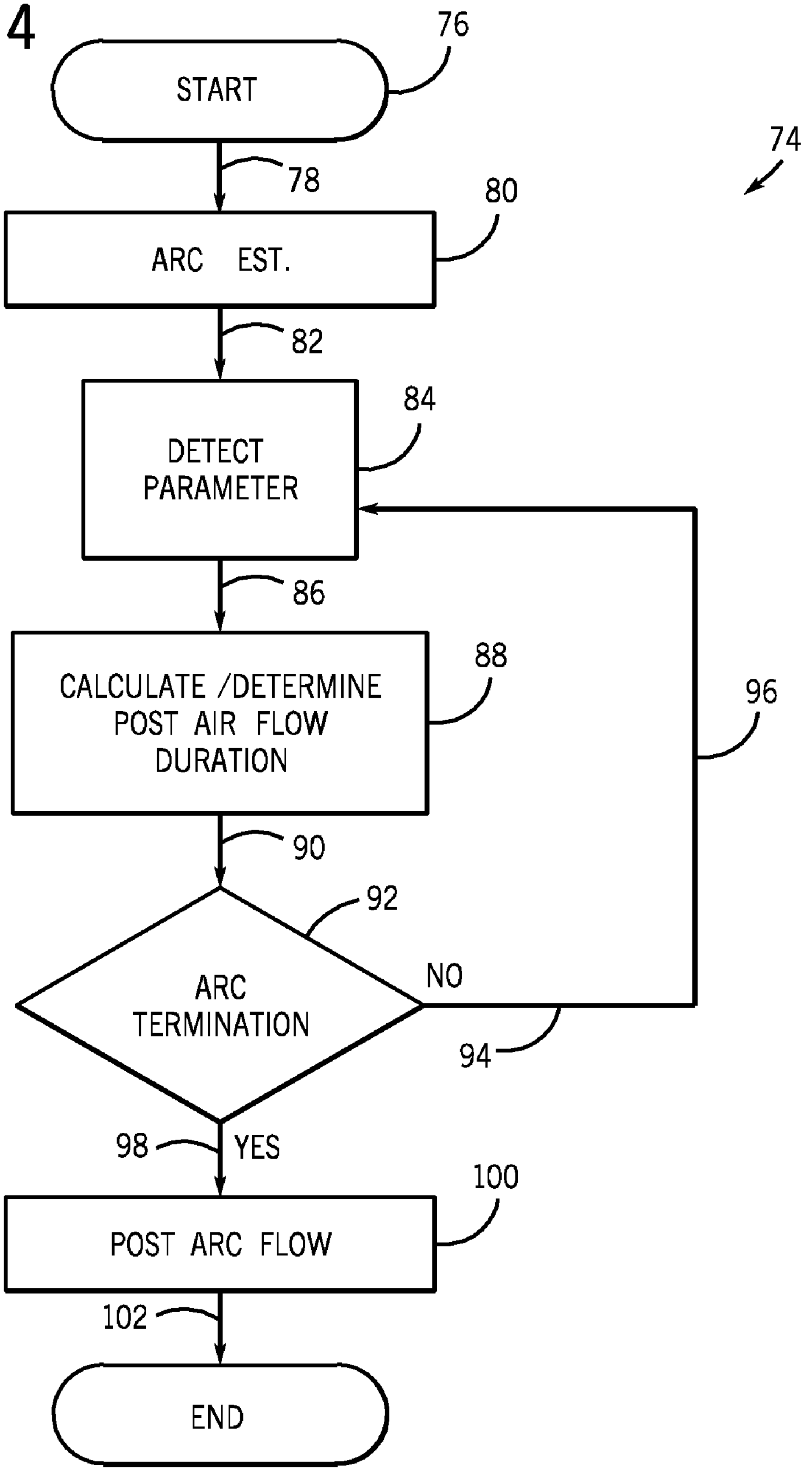
FIG. 4 is a flow chart showing one operating process of the plasma cutting system shown in FIG. 1.

Exemplary operation of plasma cutting system 10 is shown in FIG. 4. Process 74 begins at 76 with operator initialization of the power source. After initialization of the plasma cutting system 78, process 74 monitors for a cutting arc 80 and, when a cutting arc is established 82, process 74 detects the desired plasma cutting parameter 84 utilized to define the duration of the post arc gas flow. As described above with respect to FIG. 3, parameter 84 is envisioned to be any parameter from which a temperature of the plasma torch assembly can be calculated, estimated, or determined. Preferably, as described below with regard to the process shown in FIG. 5, parameter 84 is a cutting arc duration.

After acquisition of the parameter 86, process 74 calculates the post flow duration 88 from detected parameter 84. Understandably, depending on the parameter utilized, the calculation of post flow duration 88 is tailored to the detected parameter such that the post flow duration is determined, estimated, mapped, or calculated depending on the origin of the parameter detected. If the detected parameter is a temperature of the torch consumable assembly acquired by detector 60B, the post arc gas flow duration is determined directly from the temperature detected whereas if the detected parameter is an arc duration, the post arc gas flow duration is calculated from the arc duration.

Having established the initial post arc flow duration 90, process 74 monitors for arc termination 92 and if the arc has not terminated 94, process 74 updates the parameter detection 84. Upon arc termination 98, process 74 initiates a post arc gas flow 100 through the plasma torch for the duration as determined at step 88 until the post arc flow duration is satisfied 102. Accordingly, process 74 automatically determines the duration of the post arc flow from a parameter detected during the cutting process. Process 74 dynamically controls the duration of the post flow gas to prevent the unnecessary extension or premature termination of the duration of the flow of cooling gas through the plasma torch.

Figure 5:
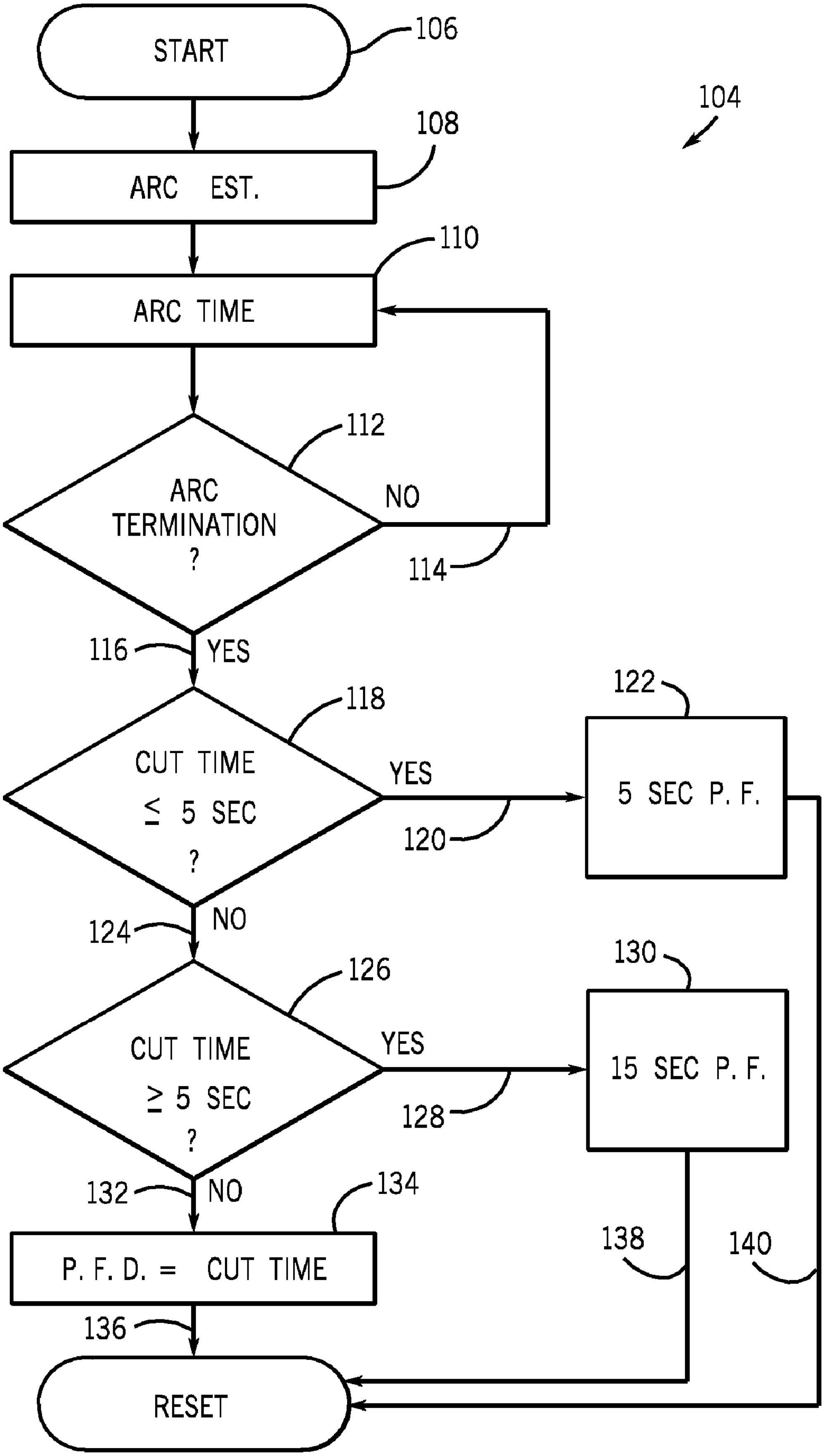
FIG. 5 is a flow chart showing an alternate operating process of the plasma cutting system shown in FIG. 1.

In a preferred embodiment, the duration of the plasma arc is the parameter utilized to determine the duration of the post arc flow of gas through the plasma torch. FIG. 5 shows an exemplary process 104 wherein the duration of the post arc gas flow is determined from the duration of a plasma arc. Process 104 begins at 106 when the plasma cutting device is turned "ON" and is repeated for each plasma cutting arc generated. When an arc is established 108, process 104 initiates an arc timer 110 which monitors the duration of the plasma cutting arc 112, 114. When the plasma cutting arc terminates 116, process 104 determines the post arc gas flow duration from the duration of the plasma arc, or the cut time, as determined by arc timer 110. If the cut time is less than a minimum cut time 118, 120, process 104 maintains post flow for a minimum post flow time 122 through the torch. Preferably, the minimum cut time and the minimum post flow time are approximately five seconds. Alternatively, it is appreciated that the minimum cut time and the minimum post flow time are not of equal value. If the duration of the cutting arc is greater than minimum cut time 124 and greater than a maximum cut time 126, 128, the time of post flow through the plasma cutting torch is maintained for a maximum post flow time 130 after the arc termination. Preferably, the maximum cut time is fifteen seconds and maximum post flow time 130 is also approximately fifteen seconds. Likewise, the maximum cut time and the maximum post flow time need not be equal.

If the arc cut time is between the preferred approximate five seconds and preferred approximate fifteen seconds 132, process 104 allows gas to flow through the plasma torch for a duration that is equal to the duration of the cutting arc 134. After the proscribed post flow duration 136, 138, 140, process 104 resets and is repeated for each arc generated. As such, process 104 provides dynamic on-the-fly control of the post flow duration of the plasma cutting system. Furthermore, the adjustable post flow duration of process 104 provides for a plasma cutting system torch cooling control that is responsive to the temperature of the torch. As such, the plasma cutting system efficiently utilizes gas by only providing that amount of gas necessary to adequately cool the plasma cutting torch. Understandably, it is appreciated that the post flow durations specified in process 104 are merely exemplary and that post flow durations of intervals other than those expressly stated are envisioned and within the scope of the claims. The adjustable duration of the post arc flow of the present invention, regardless of the specific value of any of the proscribed durations, conserves the amount of gas used during operation of the plasma cutting system.

Therefore, one embodiment of the present invention includes a welding-type cutting system having a plasma torch constructed to generate an arc and an air supply connection connectable to an air supply to deliver an air flow to the plasma torch. The system includes a controller configured to control the air flow and allow continued air flow through the plasma torch after arc termination for an adjustable duration, wherein the adjustable duration is determined by operating conditions of the plasma torch.

Another embodiment of the present invention includes a plasma cutting system having a power source constructed to generate plasma cutting power and a plasma torch actuated by a trigger connected to the power source. A gas flow system is constructed to receive pressurized gas and provide a gas flow to the plasma torch. The system includes a controller configured to monitor a plasma cutting parameter and automatically adjust a post arc gas flow interval through the torch based upon the monitored plasma cutting parameter.

A further embodiment of the present invention includes a method of controlling a plasma torch which includes the steps of detecting a plasma cutting parameter for each arc generated, determining a time for post arc gas flow from the detected plasma cutting parameter for an arc, wherein the time is variable based on operating conditions of a plasma torch, and maintaining a gas flow through the plasma torch after termination of the arc for the determined time for post arc gas flow.

As one skilled in the art will fully appreciate, the heretofore description of a plasma cutting system is one example of a plasma cutting system according to the present invention. It is understood that torches having arc starting techniques other than that shown are envisioned and within the scope of the claims.

The present invention has been described in terms of the preferred embodiment, and it is recognized that equivalents, alternatives, and modifications, aside from those expressly stated, are possible and within the scope of the appending claims.

What is claimed is:

1. A welding-type cutting system comprising:

a plasma torch constructed to generate an arc;

an air supply connection to an air supply to deliver an air flow to the plasma torch; and a controller configured to monitor operating conditions of the plasma torch during the arc and control the air flow through the plasma torch after arc termination for a duration, wherein the duration is adjustable based on monitored temperature of the plasma torch.

2. The welding-type cutting system of claim 1 wherein the adjustable duration is also determined by at least one of a cutting arch duration and a consumable component temperature.

3. The welding-type cutting system of claim 1 further comprising a temperature detector connected to the plasma torch and configured to communicate the monitored operating conditions of the plasma torch to the controller.

4. The welding-type cutting system of claim 3 wherein the temperature detector is one of a thermocouple, a strain gauge, and an optical detector.

5. The welding-type cutting system of claim 1 wherein the adjustable duration is approximately equal to an arc duration.

6. The welding-type cutting system of claim 1 wherein the air supply is provided from one of a gas cylinder and a compressor.

7. The welding-type cutting system of claim 1 wherein the adjustable duration is a minimum time for a minimum arc duration, a maximum time for a fixed maximum arc duration, and an arc duration time if the arc duration is between the minimum arc duration and the fixed maximum arc duration.

8. The welding-type cutting system of claim 7 wherein the minimum arc duration and the minimum time are approximately five seconds and the fixed maximum arc duration and the maximum time are approximately fifteen seconds.

9. A plasma cutting system comprising:

a power source constructed to generate plasma cutting power;

a plasma torch actuated by a trigger and connected to the power source;

a gas flow system constructed to receive pressurized gas and provide a gas flow to the plasma torch; and a controller configured to:

monitor a plasma cutting parameter for each arc;

provide control of post arc gas flow after each arc termination; and automatically adjust an interval of the post arc gas flow for each arc termination through the torch based upon one of cutting arc duration, an amp/second of the plasma cutting power generated by the power source for an arc, a watt/second of the plasma cutting power generated by the power source for an arc, and a temperature of the plasma torch during operation.

10. The plasma cutting system of claim 9 further comprising at least one of a strain gauge, a thermocouple, and an optical detector connected to the controller and configured to monitor a parameter related to the temperature of the plasma torch at arc termination.

11. The plasma cutting system of claim 9 wherein the plasma cutting parameter is an arc duration and a duration of the post arc gas flow through the torch is the lesser of the arc duration and a fixed maximum flow duration.

12. The plasma cutting system of claim 9 wherein the plasma cutting parameter is an arc duration and if the arc duration is less than a minimum time, the post arc gas flow is maintained for a fixed minimum duration, and if the arc duration is between the minimum time and a fixed maximum time, the post arc gas flow is maintained for a time equal to the arc duration, and if the arc duration is longer than the fixed maximum time, the post arc gas flow is maintained for a fixed maximum duration.

13. The plasma cutting system of claim 12 wherein the minimum time and the fixed minimum duration are approximately five seconds and the fixed maximum time is approximately fifteen seconds.

14. The plasma cutting system of claim 9 further comprising an input connected to the controller, the input configured to allow an operator to select one of a type of plasma cutting process and a type of consumable assembly which defines the arc parameter.

15. A method of controlling a plasma torch comprising the steps of:

detecting a plasma cutting parameter for each arc generated;

determining a time for post arc gas flow from the detected plasma cutting parameter for each arc, wherein the time is variable based on operating conditions of a plasma torch; and maintaining a gas flow through the plasma torch after termination of each arc for the determined time for post arc gas flow;

wherein the plasma cutting parameter is one of an arc duration, an amount of power consumed by the arc, a temperature of the plasma torch, a type of consumable set, and a type of plasma cutting process.

16. The method of claim 15 wherein the step of determining a time for post arc flow includes one of setting the flow time to a minimum flow time for a cutting arc maintained for a minimum arc time, setting the flow time equal to an arc time for a cutting arc maintained between the minimum arc time and a fixed maximum arc time, and setting the flow time to a maximum flow time for a cutting arc maintained for the fixed maximum arc time.

17. The method of claim 16 wherein the minimum flow time is five seconds and the maximum flow time is fifteen seconds.

18. The method of claim 15 further comprising receiving an operator input indicative of the type of plasma cutting process and determining the time for post arc gas flow from the received input.

19. The method of claim 15 further comprising detecting release of a trigger of a plasma torch and initiating a timer to measure the time for post arc gas flow.

* * * * *